United States Patent
Drees

(10) Patent No.: US 11,274,847 B2
(45) Date of Patent: Mar. 15, 2022

(54) THERMOSTAT WITH LEAST SQUARES ESTIMATION OF POWER SAVINGS

(71) Applicant: Johnson Controls Technology Company, Auburn Hills, MI (US)

(72) Inventor: Kirk H. Drees, Cedarburg, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 364 days.

(21) Appl. No.: 16/584,617

(22) Filed: Sep. 26, 2019

(65) Prior Publication Data
US 2020/0103133 A1 Apr. 2, 2020

Related U.S. Application Data

(60) Provisional application No. 62/737,412, filed on Sep. 27, 2018.

(51) Int. Cl.
*F24F 11/46* (2018.01)
*F24F 11/523* (2018.01)
(Continued)

(52) U.S. Cl.
CPC ............ *F24F 11/46* (2018.01); *F24F 11/523* (2018.01); *G05B 15/02* (2013.01); *G06F 30/20* (2020.01);
(Continued)

(58) Field of Classification Search
CPC ...... F24F 11/46; F24F 11/523; F24F 2140/60; F24F 11/67; F24F 11/64; G05B 15/02;
(Continued)

(56) References Cited

U.S. PATENT DOCUMENTS

| 7,031,880 | B1 | 4/2006 | Seem et al. |
| 7,729,882 | B2 | 6/2010 | Seem |

(Continued)

OTHER PUBLICATIONS

U.S. Appl. No. 16/531,892, filed Aug. 5, 2019, Johnson Controls Technology Company.
(Continued)

*Primary Examiner* — Ramesh B Patel
(74) *Attorney, Agent, or Firm* — Foley & Lardner LLP

(57) ABSTRACT

A space controller includes processors and non-transitory computer-readable media storing instructions that, when executed by the processors, cause the processors to perform operations. The operations include obtaining a power consumption model that defines a change in power consumption of HVAC equipment that operate to provide heating or cooling to a space as a function of a change in temperature setpoint for the space and model parameters that represent thermal properties of the space. The operations include estimating values of the model parameters based on training data including values of the power consumption of the HVAC equipment, the temperature setpoint for the space, and outdoor air temperature at multiple times within a training period. The operations include using the power consumption model and the values of the model parameters to predict a change in the power consumption of the HVAC equipment expected to result from a change in the temperature setpoint.

20 Claims, 6 Drawing Sheets

(51) Int. Cl.
*G05B 15/02* (2006.01)
*G06F 30/20* (2020.01)
*F24F 140/60* (2018.01)
*G06F 119/06* (2020.01)

(52) U.S. Cl.
CPC ....... *F24F 2140/60* (2018.01); *G06F 2119/06* (2020.01)

(58) Field of Classification Search
CPC ............. G05B 2219/2614; G06F 30/20; G06F 2119/06
See application file for complete search history.

(56) References Cited

U.S. PATENT DOCUMENTS

| | | | |
|---|---|---|---|
| 8,255,085 B2 | 8/2012 | Salsbury | |
| 8,332,075 B2 | 12/2012 | Harrod et al. | |
| 8,755,943 B2 | 6/2014 | Wenzel | |
| 9,322,566 B2 | 4/2016 | Wenzel et al. | |
| 9,739,496 B2 | 8/2017 | Seem et al. | |
| 9,964,328 B2 | 5/2018 | Ribbich et al. | |
| 10,020,956 B2 | 7/2018 | Alberth, Jr. | |
| 10,146,237 B2* | 12/2018 | Turney | G05B 15/02 |
| 10,162,327 B2 | 12/2018 | Sinha et al. | |
| 10,295,214 B2 | 5/2019 | Bentz et al. | |
| 10,318,266 B2 | 6/2019 | Ribbich et al. | |
| 2009/0171862 A1 | 7/2009 | Harrod et al. | |
| 2014/0330695 A1* | 11/2014 | Steven | G06Q 30/0611 705/37 |
| 2015/0293505 A1* | 10/2015 | Acosta Gonzalez | G05D 7/0682 700/29 |
| 2016/0327298 A1 | 11/2016 | Sinha et al. | |
| 2016/0327921 A1 | 11/2016 | Ribbich et al. | |
| 2017/0076263 A1 | 3/2017 | Bentz et al. | |
| 2017/0102681 A1* | 4/2017 | Verhoeven | G05B 17/02 |
| 2017/0123391 A1 | 5/2017 | Sinha et al. | |
| 2017/0234562 A1 | 8/2017 | Ribbich et al. | |
| 2018/0031262 A1* | 2/2018 | Atchison | F24F 11/62 |
| 2018/0101158 A1* | 4/2018 | Guthrie | G05B 15/02 |
| 2018/0102954 A1* | 4/2018 | Schubert | H04L 12/4625 |
| 2018/0102958 A1 | 4/2018 | Guthrie et al. | |
| 2018/0163984 A1* | 6/2018 | Alberth, Jr. | F24F 11/30 |
| 2018/0180314 A1* | 6/2018 | Brisette | G05B 23/0281 |
| 2018/0266718 A1* | 9/2018 | Gillette | F24F 11/64 |
| 2018/0267701 A1 | 9/2018 | Rigg et al. | |
| 2018/0275625 A1 | 9/2018 | Park et al. | |
| 2018/0299151 A1 | 10/2018 | Ajax et al. | |
| 2018/0299158 A1 | 10/2018 | Ajax et al. | |
| 2018/0299159 A1 | 10/2018 | Ajax et al. | |
| 2018/0299161 A1 | 10/2018 | Ribbich et al. | |
| 2018/0356111 A1 | 12/2018 | Salsbury et al. | |
| 2019/0017719 A1 | 1/2019 | Sinha et al. | |
| 2019/0145648 A1 | 5/2019 | Sinha et al. | |
| 2019/0178518 A1 | 6/2019 | Zimmerman et al. | |
| 2019/0178523 A1 | 6/2019 | Zimmerman et al. | |
| 2019/0378020 A1* | 12/2019 | Camilus | G05B 13/048 |
| 2020/0356087 A1* | 11/2020 | Elbsat | G05B 23/0254 |
| 2021/0034024 A1* | 2/2021 | Patel | F24F 11/83 |

OTHER PUBLICATIONS

Adrian S Nastase. How to Derive the RMS Value of a Triangle Waveform, url "https://masteringelectronicsdesign.com/how-to-derive-the-rms-value-of-a-trianglewaveform/", note "[online; accessed Apr. 20, 2018]".

Josefin Berner, Tore Hagglund, and Karl Johan Astrom. Asymmetric relay autotuning—practical features for industrial use. Control Engineering Practice, 54:231-245, 2016.

Michael Utzinger and James H Wasley. Building balance point. Vital Signs Curriculum Materials Project, University of California-Berkeley, and University of Wisconsin-Milwaukee, 1997.

Timothy I Salsbury. A new pulse modulation adaptive controller (pmac) applied to hvac systems. Control Engineering Practice, 10(12):1357-1370, 2002.

* cited by examiner

THERMOSTAT WITH LEAST SQUARES ESTIMATION OF POWER SAVINGS

CROSS-REFERENCE TO RELATED PATENT APPLICATION

This application claims the benefit of and priority to U.S. Provisional Patent Application No. 62/737,412 filed Sep. 27, 2018, the entire disclosure of which is incorporated by reference herein.

BACKGROUND

The present disclosure relates generally to thermostats or other space controllers that operate control temperature or other variable states or conditions of a room or space. The present disclosure relates more particularly to a thermostat or space controller that operates to reduce energy consumption of building equipment. More specifically, the present disclosure relates to systems and methods for estimating energy consumption of building equipment and automatically adjusting the operation of building equipment to reduce energy consumption.

Generally, a thermostat is a component of a heating, ventilation, and air conditioning (HVAC) control system. A thermostat senses the temperature or other parameters (e.g., humidity) of an environment (e.g., a building, room, plant, or the like), and controls components of the HVAC system in order to maintain a set point for the temperature or other parameters. A thermostat may be designed to control a heating or cooling system (e.g., heating and cooling units) or an air conditioner. Thermostats use a variety of sensors to measure temperature and other desired parameters of a system.

SUMMARY

One implementation of the present disclosure is a space controller, according to some embodiments. The space controller includes one or more processors, and one or more non-transitory computer-readable media storing instructions that, when executed by the one or more processors, cause the one or more processors to perform operations, according to some embodiments. The operations include obtaining a power consumption model that defines a change in power consumption of HVAC equipment that operate to provide heating or cooling to a space as a function of a change in temperature setpoint for the space and one or more model parameters that represent thermal properties of the space, according to some embodiments. The operations include estimating values of the one or more model parameters based on training data including values of the power consumption of the HVAC equipment, the temperature setpoint for the space, and outdoor air temperature at multiple times within a training period, according to some embodiments. In some embodiments, the operations include using the power consumption model and the values of the one or more model parameters to predict a change in the power consumption of the HVAC equipment expected to result from a change in the temperature setpoint.

In some embodiments, the power consumption model defines the change in power consumption of the HVAC equipment as a function of a change in the outdoor air temperature, the change in the temperature setpoint, and the one or more model parameters.

In some embodiments, the one or more model parameters define an internal heat generation of the space, a thermal capacitance of the space, and a thermal conductivity of heat transfer of the space.

In some embodiments, the power consumption model predicts the change in power consumption of the HVAC equipment resulting from a change in at least one of the outdoor air temperature and the temperature setpoint.

In some embodiments, the training data includes multiple data triplets, each data triplet including a value of the temperature setpoint, the outdoor air temperature, and the power consumption at a particular time.

In some embodiments, the operations performed by the one or more processors further include estimating a monetized savings amount for a particular change in the power consumption. In some embodiments, the monetized savings amount is estimated using an average time period used to obtain the training data.

In some embodiments, the operations performed by the one or more processors further include providing at least one of the estimated change in power consumption or the monetized savings amount to a user interface for display. In some embodiments, the estimated change in power consumption or the monetized savings amount are provided to the user interface for different temperature setpoints.

In some embodiments, the operations performed by the one or more processors further include estimating the monetized savings amount for different temperature setpoints. In some embodiments, the operations performed also include automatically adjusting a currently used temperature setpoint or a schedule of the temperature setpoint based on the monetized savings amount to reduce the monetized savings amount.

Another implementation of the present disclosure is a system for estimating power savings associated with operating equipment, according to some embodiments. In some embodiments, the system includes building equipment operable to affect a variable state or condition of a space, and a space controller. The space controller includes one or more processors, and one or more non-transitory computer-readable media storing instructions that, when executed by the one or more processors, cause the one or more processors to perform operations, according to some embodiments. The operations include obtaining a power consumption model that defines a change in power consumption of HVAC equipment that operate to provide heating or cooling to a space as a function of a change in temperature setpoint for the space and one or more model parameters that represent thermal properties of the space, according to some embodiments. The operations include estimating values of the one or more model parameters based on training data including values of the power consumption of the HVAC equipment, the temperature setpoint for the space, and outdoor air temperature at multiple times within a training period, according to some embodiments. The operations include using the power consumption model and the values of the one or more model parameters to predict a change in the power consumption of the HVAC equipment expected to result from a change in the temperature setpoint.

In some embodiments, the power consumption model defines the change in power consumption of the HVAC equipment as a function of a change in the outdoor air temperature, the change in the temperature setpoint, and the one or more model parameters.

In some embodiments, the one or more model parameters define an internal heat generation of the space, a thermal capacitance of the space, and a thermal conductivity of the space.

In some embodiments, the power consumption model predicts the change in power consumption of the HVAC equipment resulting from a change in at least one of the outdoor air temperature and the temperature setpoint.

In some embodiments, the training data includes multiple data triplets, each data triplet including a value of the temperature setpoint, the outdoor air temperature, and the power consumption at a particular time.

In some embodiments, the operations performed by the one or more processors include estimating a monetized savings amount for a particular change in the power consumption. In some embodiments, the monetized savings amount is estimated using an average time period used to obtain the training data.

In some embodiments, the operations performed by the one or more processors further include providing at least one of the estimated change in power consumption or the monetized savings amount to a user interface for display. In some embodiments, the estimated change in power consumption or the monetized savings amount are provided to the user interface for multiple different temperature setpoints.

In some embodiments, the operations performed by the one or more processors further include estimating the monetized savings amount for different temperature setpoints, and automatically adjusting a currently used temperature setpoint or a schedule of the temperature setpoint based on the monetized savings amount to reduce the monetized savings amount.

Another implementation of the present disclosure is a method for estimating power consumption of equipment, according to some embodiments. The method includes obtaining a power consumption model that defines power consumption of HVAC equipment that operate to provide heating or cooling to a space as a function of a temperature setpoint for the space and one or more model parameters that represent thermal properties of the space, according to some embodiments. The method also includes estimating values of the one or more model parameters based on training data including values of the power consumption of the HVAC equipment, the temperature setpoint for the space, and outdoor air temperature at multiple times within a training period, according to some embodiments. The method also includes using the power consumption model and the values of the one or more model parameters to predict the power consumption of the HVAC equipment expected to result from a new value of the temperature setpoint, according to some embodiments.

In some embodiments, the power consumption model defines the change in power consumption of the HVAC equipment as a function of the outdoor air temperature, the temperature setpoint, and the one or more model parameters.

In some embodiments, the one or more model parameters define an internal heat generation of the space, a thermal capacitance of the space, and a thermal conductivity of the space.

In some embodiments, the training data includes multiple data triplets, each data triplet including a value of the temperature setpoint, the outdoor air temperature, and the power consumption at a particular time.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a thermostat for estimating power savings of heating, ventilation, and air conditioning (HVAC) system (or equipment, such as heating and cooling units) attributed to changes in zone temperature setpoint and/or outdoor temperature is shown, according to various example embodiments. The estimated power savings described herein can be used to determine various temperature setpoints or schedules for a given or expected outdoor temperature that can be used to reduce or minimize energy usage by the HVAC system under conditions that are unique to the building or space. In some embodiments, the estimated power savings for various different setpoints are presented to the user on a user interface of the thermostat, and the user can change the setpoint or schedule based on the estimated power savings. In some embodiments, an alternative setpoint or schedule than the one actually used (or set) may be automatically set by the thermostat to provide a desired or predetermined amount of energy savings.

One technique for estimating the power savings of HVAC equipment attributable to a setpoint change is described in U.S. patent application Ser. No. 16/531,892 ("the '892 application") filed Aug. 5, 2019, the entire disclosure of which is incorporated by reference herein. The technique described in the '892 application estimates power savings by calculating a steady state gain based on a balance point temperature (e.g., an outdoor air temperature) at which heat gains into the building are substantially equal to heat losses from the building. The systems and methods described in the present disclosure provide an alternative to the technique described in the '892 application and do not require the balance point temperature or steady state gain to be calculated.

Thermostat and HVAC System

Figure 1A:
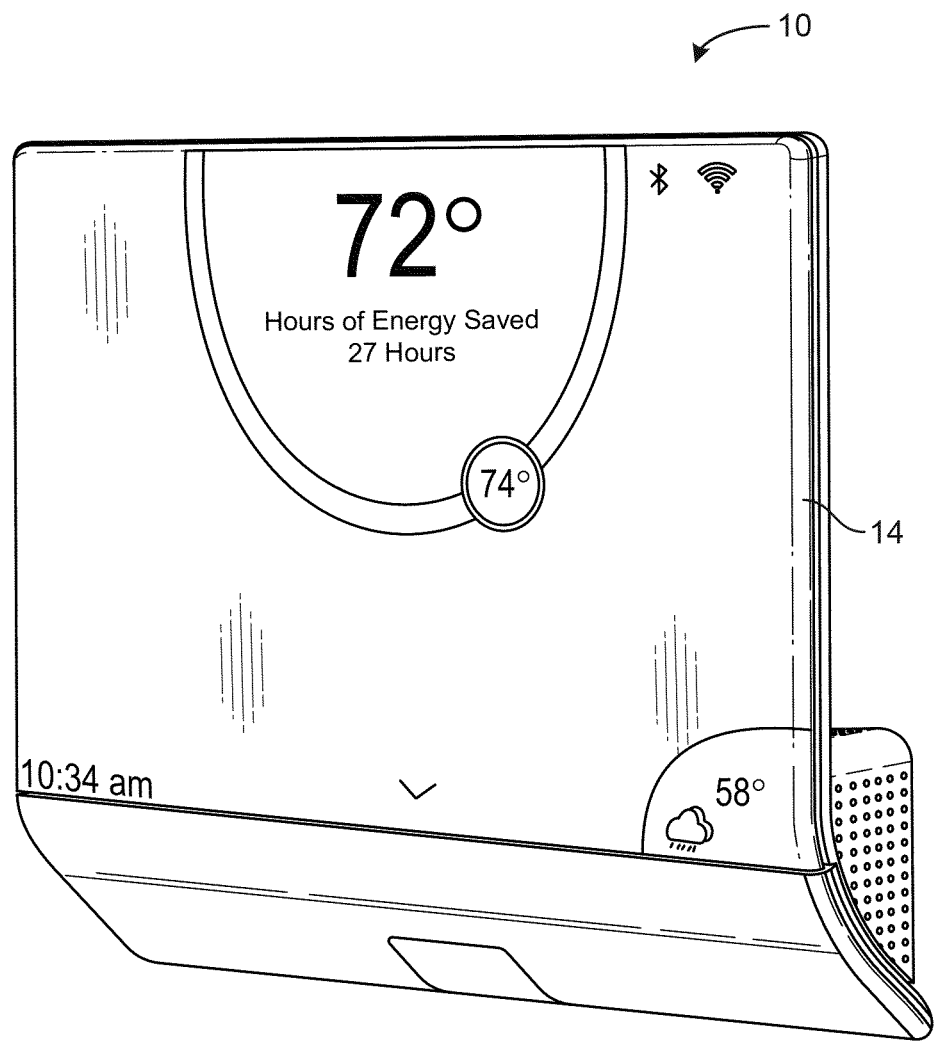
FIG. 1A is a drawing of a thermostat with a transparent cantilevered display, according to an example embodiment.

FIG. 1A is a drawing of a thermostat 10 that includes a transparent cantilevered user interface 14. The user interface 14 may be an interactive display that can display information to a user and receive input from the user. The user interface 14 may be transparent such that a user can view information on the display and view a surface (e.g., a wall) located behind the display. In various embodiments, the thermostat 10 can be configured to estimate run-time saving of the HVAC equipment (e.g., heating and cooling units) of a home or building of the user under one or more different temperature setpoints or schedules than the temperature setpoint or schedule currently used. In some embodiments, the thermostat 10 is configured to provide an optimal temperature setpoint or schedule to the user via the user interface 14 on the thermostat 10 in order to reduce the runtime of the HVAC equipment, thereby reducing energy usage. In some embodiments, the thermostat 10 is configured to automatically adjust the temperature setpoint or schedule based on the optimal temperature set-point or schedule. Thermostats with transparent and cantilevered user interfaces are described in further detail in U.S. patent application Ser. No. 15/146,649 filed May 4, 2016, the entirety of which is incorporated by reference herein.

The user interface 14 can be a touchscreen or other type of electronic display configured to present information to a user in a visual format (e.g., as text, graphics, etc.) and receive input from a user (e.g., via a touch-sensitive panel). For example, the user interface 14 may include a touch-sensitive panel layered on top of an electronic visual display. A user can provide inputs through simple or multi-touch gestures by touching the user interface 14 with one or more fingers and/or with a stylus or pen. The user interface 14 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 14 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoS), or any other display technologies known in the art. In some embodiments, the user interface 14 is configured to present visual media (e.g., text, graphics, etc.) without requiring a backlight.

Figure 1B:
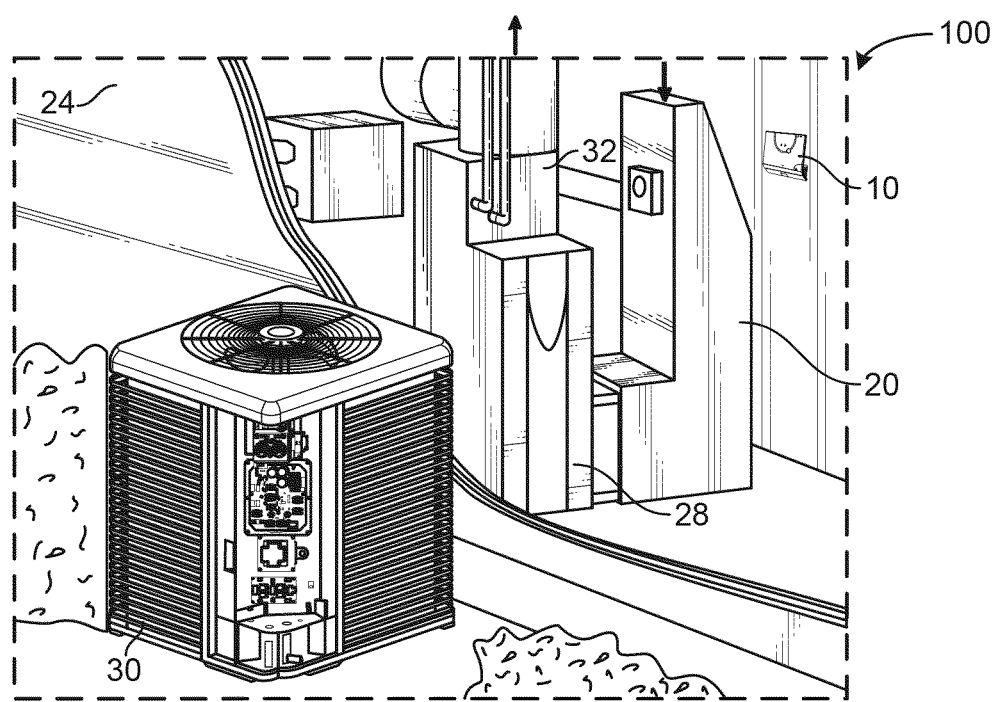
FIG. 1B is a schematic drawing of a building equipped with a residential heating and cooling system and a thermostat, according to an example embodiment.

FIG. 1B illustrates a residential heating and cooling system 100, such as an HVAC system. The residential heating and cooling system 100 may provide heated and cooled air to a residential structure. Although described as a residential heating and cooling system 100, embodiments of the systems and methods described herein can be utilized in a cooling unit or a heating unit of a variety of applications including commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24. Refrigerant conduits transfer refrigerant between indoor unit 28 and outdoor unit 30, typically transferring primarily liquid refrigerant in one direction and primarily vaporized refrigerant in an opposite direction.

When the system 100 shown in FIG. 1B is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28 (i.e., indoor coil 32) serves as an evaporator coil. Indoor coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outdoor unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through residence 24 by means of ductwork 20, as indicated by the arrows entering and exiting ductwork 20. The overall system 100 operates to maintain a desired temperature as set by thermostat 10. When the temperature sensed inside the residence 24 is higher than the set point on the thermostat 10 (with the addition of a relatively small tolerance), the air conditioner will become operative to cool additional air for circulation through the residence 24. When the temperature reaches the set point (with the removal of a relatively small tolerance), the unit can stop the cooling cycle temporarily.

In some embodiments, the system 100 is configured so that the outdoor unit 30 is controlled to achieve a more elegant control over temperature and humidity within the residence 24. The outdoor unit 30 is controlled to operate components within the outdoor unit 30, and the system 100, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 2:
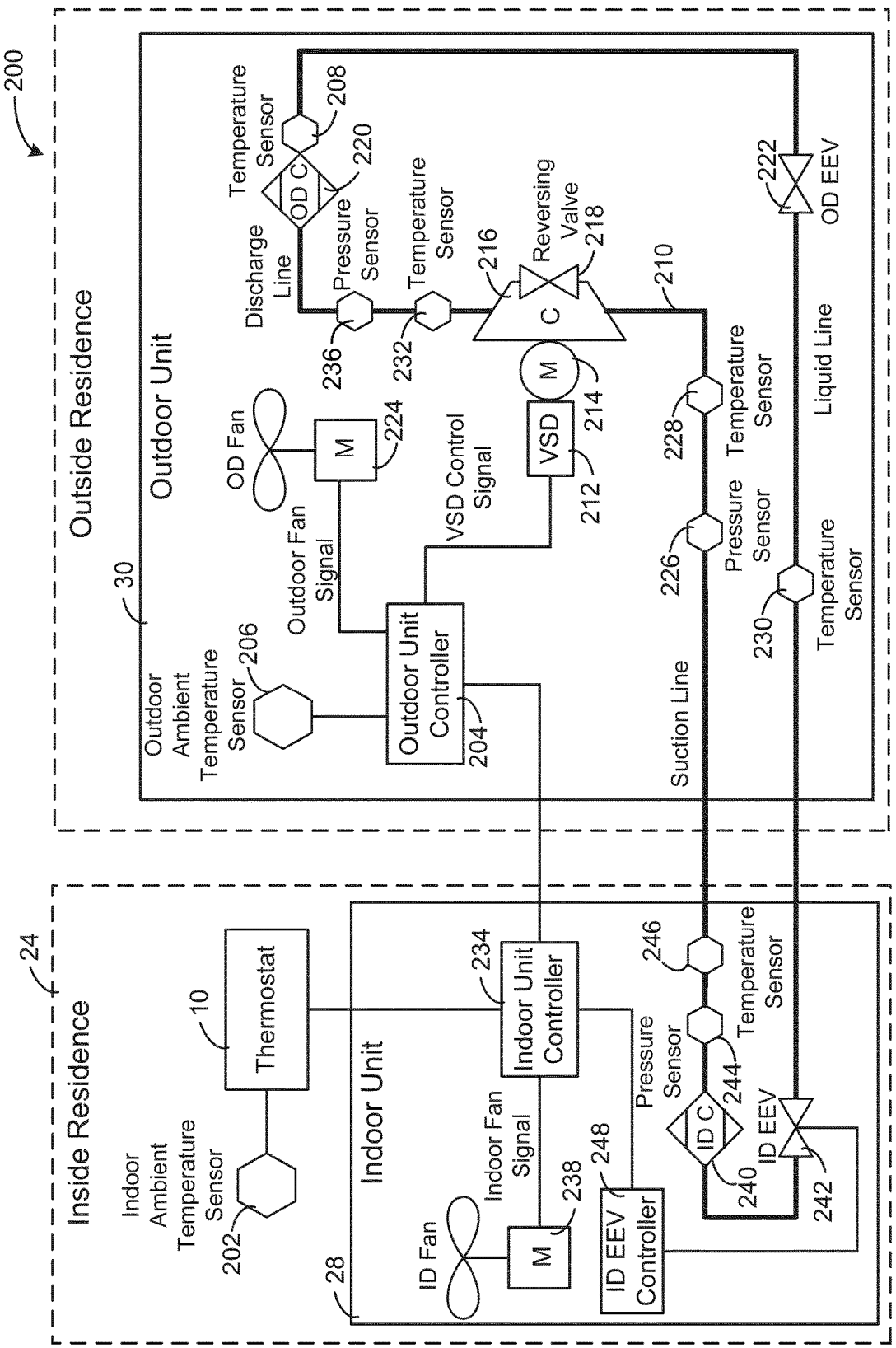
FIG. 2 is a schematic drawing of the thermostat and the residential heating and cooling system of FIG. 1, according to an example embodiment.

Referring now to FIG. 2, an HVAC system 200 is shown according to an example embodiment. Various components of system 200 are located inside residence 24 while other components are located outside residence 24. Outdoor unit 30, as described with reference to FIG. 1, is shown to be located outside residence 24 while indoor unit 28 and thermostat 10, as described with reference to FIG. 1, are shown to be located inside the residence 24. In various embodiments, the thermostat 10 can cause the indoor unit 28 and the outdoor unit 30 to heat residence 24. In some embodiments, the thermostat 10 can cause the indoor unit 28 and the outdoor unit 30 to cool the residence 24. In other embodiments, the thermostat 10 can command an airflow change within the residence 24 to adjust the humidity within the residence 24.

Thermostat 10 can be configured to generate control signals for indoor unit 28 and/or outdoor unit 30. The thermostat 10 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 10 may measure the temperature of residence 24 via the indoor ambient temperature sensor 202. Further, the thermostat 10 can be configured to receive the temperature outside residence 24 via communication with the outdoor unit controller 204. In various embodiments, the thermostat 10 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point.

The indoor unit 28 and the outdoor unit 30 may be electrically connected. Further, indoor unit 28 and outdoor unit 30 may be coupled via conduits 210. The outdoor unit 30 can be configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 can be configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 can be configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 10 to determine operating values for components of the system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate system 200 as a heat pump or an air conditioner. For example, the outdoor unit controller 204 may cause reversing valve 218 to direct compressed refrigerant to the indoor coil 32 (240 in FIG. 2) while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of system 200.

Further, in various embodiments, outdoor unit controller 204 can be configured to control and/or receive data from an outdoor electronic expansion valve (EEV) 222. The outdoor electronic expansion valve 222 may be an expansion valve controlled by a stepper motor. In this regard, the outdoor unit controller 204 can be configured to generate a step signal (e.g., a PWM signal) for the outdoor electronic expansion valve 222. Based on the step signal, the outdoor electronic expansion valve 222 can be held fully open, fully closed, partial open, etc. In various embodiments, the outdoor unit controller 204 can be configured to generate step signal for the outdoor electronic expansion valve 222 based on a subcool and/or superheat value calculated from various temperatures and pressures measured in system 200. In one embodiment, the outdoor unit controller 204 is configured to control the position of the outdoor electronic expansion valve 222 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 204 can be configured to control and/or power outdoor fan 224. The outdoor fan 224 can be configured to blow air over the outdoor coil 220. In this regard, the outdoor unit controller 204 can control the amount of air flowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 can be configured to measure and store the temperatures and pressures of the refrigerant at various locations of the conduits 210. The pressure sensors may be any kind of transducer that can be configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216). Further, the outdoor unit 30 is shown to include pressure sensor 236. The pressure sensor 236 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) can be configured to measure the temperature of the refrigerant at various locations inside conduits 210.

Referring now to the indoor unit 28, the indoor unit 28 is shown to include indoor unit controller 234, indoor electronic expansion valve controller 248, an indoor fan 238, an indoor coil 240, an indoor electronic expansion valve 242, a pressure sensor 244, and a temperature sensor 246. The indoor unit controller 234 can be configured to generate control signals for indoor electronic expansion valve controller 248. The signals may be set points (e.g., temperature set point, pressure set point, superheat set point, subcool set point, step value set point, etc.). In this regard, indoor electronic expansion valve controller 248 can be configured to generate control signals for indoor electronic expansion valve 242. In various embodiments, indoor electronic expansion valve 242 may be the same type of valve as outdoor electronic expansion valve 222. In this regard, indoor electronic expansion valve controller 248 can be configured to generate a step control signal (e.g., a PWM wave) for controlling the stepper motor of the indoor electronic expansion valve 242. In this regard, indoor electronic expansion valve controller 248 can be configured to fully open, fully close, or partially close the indoor electronic expansion valve 242 based on the step signal.

Indoor unit controller 234 can be configured to control indoor fan 238. The indoor fan 238 can be configured to blow air over indoor coil 240. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 240). In other embodiments, the pressure sensor 244 and/or the temperature sensor 246 may be located on the liquid line (i.e., a predefined distance from indoor coil 240).

Figure 3:
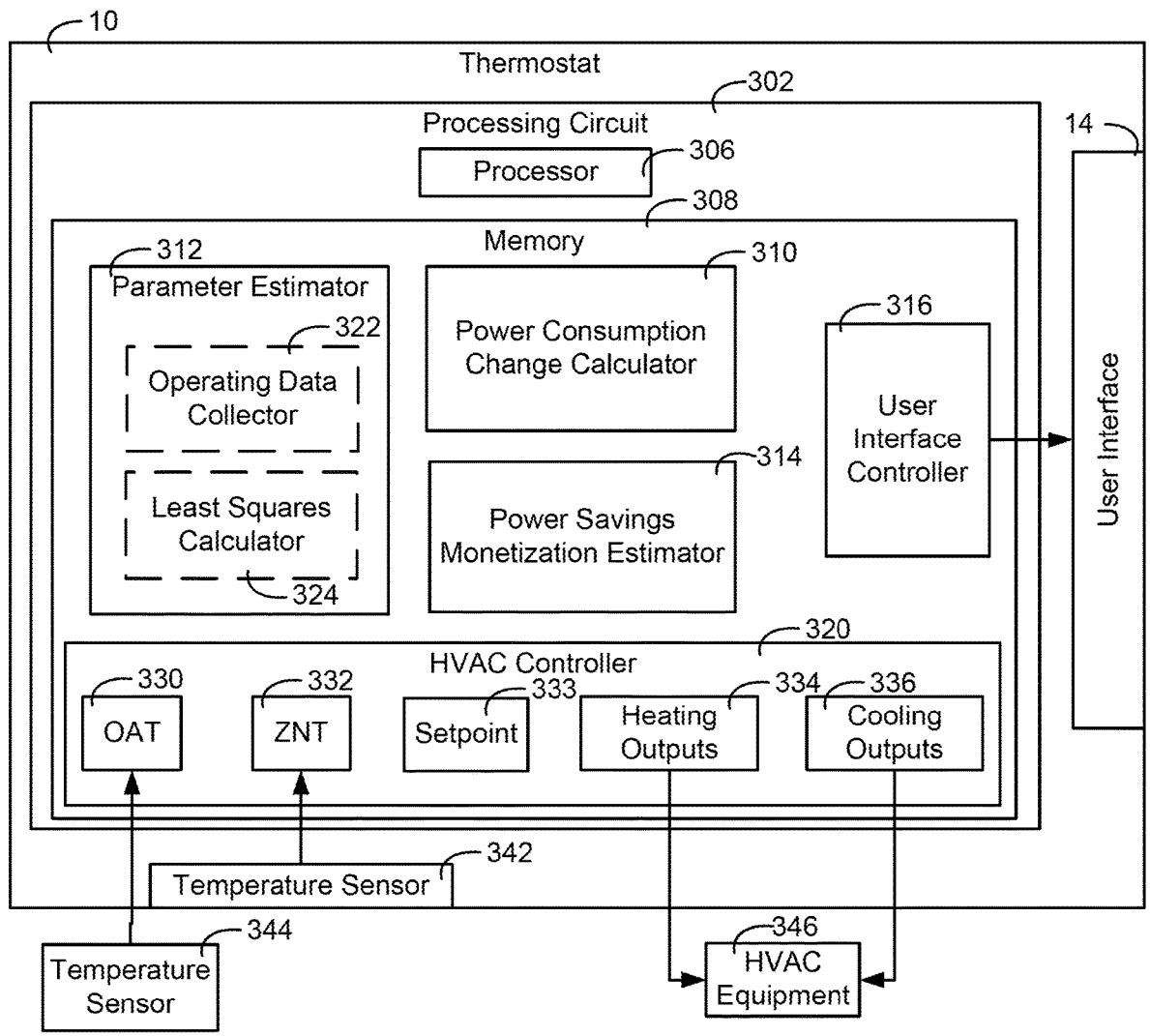
FIG. 3 is a block diagram of the thermostat of FIGS. 1A, 1B, and 2 shown in greater detail, according to an example embodiment.

Referring now to FIG. 3, the thermostat 10 as described with reference to FIGS. 1A-2 is shown in greater detail, according to an example embodiment. The thermostat 10 is shown to communicate to temperature sensors 342 and 344 and HVAC equipment 346. The thermostat 10 is further shown to include the user interface 14.

The user interface 14 may be a touch screen display configured to receive input from a user and display images and text to a user. In some embodiments, user interface 14 is at least one or a combination of a resistive touch screen and a capacitive touch screen (e.g., projective capacitive touch screen). In some embodiments, the user interface 14 is a transparent touch screen device. In some embodiments, the user interface 14 is a laser display, a holographic display, a light field display, and/or any other display or combination of displays. The user interface 14 may be configured to display images and text to a user but may not be configured to receive input from the user. In some embodiments, the user interface 14 is one or a combination of a CRT display, an LCD display, an LED display, a plasma display, and/or an OLED display (e.g., a transparent OLED display).

The temperature sensors 342 and 344 can be configured to measure the ambient temperature of a building (e.g. the residence 24), the temperature of a zone associated with the building, and/or an outdoor temperature. Temperature sensors 342 and 344 may be sensors outputting an analog signal (e.g., sinusoid, square wave, PWM wave, etc.) and/or a measurable value (e.g. current, voltage, resistance) and/or may be a temperature module outputting a digital value. The temperature sensors 342 and 344 may communicate a digital and/or analog value to the thermostat 10. The temperature sensors 342 and/or 344 may be located inside an enclosure of the thermostat 10, outside the thermostat 10, outside a building, and/or inside a building. The temperature sensors 342 and 344 may be any other type or combination of temperature sensor. In some embodiments, temperature sensor 344 is an outdoor temperature sensor owned by a third party (e.g., a weather forecaster, or a weather service). The thermostat 10 may receive (e.g., receive via a network) the temperature from the third party which identifies the outdoor temperature.

The temperature sensors 342 and 344 may be part of thermostat 10 (e.g., located in the same enclosure as thermostat 10), or may be one or more external sensors. The thermostat 10 can receive, determine, and/or store measured temperature values of temperature sensors 342 and 344. The temperature measured by the temperature sensor 342 may be stored as zone or indoor temperature (ZNT) 332. The temperature measured by the temperature sensors 344 may be stored as an outdoor air temperature (OAT) 330.

The processing circuit 302 is shown to include a processor 306 and a memory 308. The processor 306 can be a general purpose or specific purpose processor, an application specific integrated circuit (ASIC), one or more field programmable gate arrays (FPGAs), a group of processing components, or other suitable processing components. The processor 306 may be configured to execute computer code and/or instructions stored in the memory 308 or received from other computer readable media (e.g., CDROM, network storage, a remote server, etc.).

The memory 308 can include one or more devices (e.g., memory units, memory devices, storage devices, etc.) for storing data and/or computer code for completing and/or facilitating the various processes described in the present disclosure. The memory 308 can include random access memory (RAM), read-only memory (ROM), hard drive storage, temporary storage, non-volatile memory, flash memory, optical memory, or any other suitable memory for storing software objects and/or computer instructions. The memory 308 can include database components, object code components, script components, or any other type of information structure for supporting the various activities and information structures described in the present disclosure. The memory 308 can be communicably connected to the processor 306 via the processing circuit 302 and can include computer code for executing (e.g., by the processor 306) one or more processes described herein.

In some embodiments, the memory 308 includes an HVAC controller 320. The HVAC controller 320 can be configured to control the HVAC equipment 346. The HVAC equipment 346 can be the indoor unit 28 and/or the outdoor unit 30 as well as any industrial airside or waterside system or other HVAC equipment. Examples of such industrial systems are described in more detail in U.S. patent application Ser. No. 15/338,215, filed on Oct. 28, 2016, the entire disclosure of which is incorporated by reference herein.

In some embodiments, the HVAC controller 320 controls the HVAC equipment 346 based on a temperature setpoint 333. In some embodiments, the HVAC controller 320 may use any of a variety of control algorithms (e.g., state-based algorithms, extremum-seeking control algorithms, PID control algorithms, model predictive control algorithms, feedback control algorithms, etc.) to determine appropriate control actions for any of the HVAC equipment 346 connected to the thermostat 10 as a function of temperature and/or humidity.

The HVAC controller 320 is shown to store values for the OAT 330, the ZNT 332, and the temperature setpoint 333. Further, the HVAC controller 320 is shown to store and/or determine, heating outputs 334 and cooling outputs 336 based on the temperature setpoint 333. The heating outputs 334 may be commands to turn on one or more heating states of the HVAC equipment 346. For example, the heating outputs 334 may be a single on/off stage heating or may be first and second stage heating (e.g., W1 and W2). Similarly, the cooling outputs 336 can be determined and/or stored by the HVAC controller 320 for one or more cooling stages of the HVAC equipment 346. For example, the cooling stages may be a single on/off stage cooling or may be first and second stage cooling (e.g., Y1 and Y2). Various other outputs can be determined and/or stored by the HVAC controller 320, for example, a fan output (e.g., G), an auxiliary output (e.g., AUX), and/or any other suitable output.

Based on the outputs for the HVAC equipment 346, the HVAC controller 320 may include one or more output circuits of the thermostat 10. The output circuits may be solid state switches, relays, triacs, FET switches, BJT switches, etc. Based on which heating or cooling stage that the HVAC controller 320 determines to turn on or off to meet the setpoint 333 (e.g., the heating outputs 334 and/or the cooling outputs 336), the output circuits can be configured to cause the HVAC equipment 346 to be operated per the outputs (e.g., the heating outputs 334 and the cooling outputs 336) determined by the HVAC controller 320.

In some embodiments, the memory 308 includes a power consumption change calculator 310. In some embodiments, the power consumption change calculator 310 calculates changes in the HVAC system power consumption attributed to a change in a zone temperature setpoint $T_{zn,sp}$ (or zone temperature $T_{zn}$) and/or outdoor temperature $T_{oa}$ corresponding to the efficiency $\eta_{equip}$ of the HVAC system (or HVAC equipment). For example, an occupied zone (or space) has multiple heat flows, such as added or removed heat $\dot{Q}_{HVAC}$ by the HVAC system (or HVAC equipment), internal heat loads $\dot{Q}_{int}$ (e.g., heat generated by people, computers, devices, plug loads, lighting, and/or the like), and heat passed through a building envelope $\dot{Q}_{env}$ (e.g., heat transfer, advection, and/or the like). Thus, a steady state energy balance of the zone may be defined by equation 1:

$$\dot{Q}_{HVAC} + \dot{Q}_{int} + \dot{Q}_{env} = 0 \qquad (1)$$

The heat flow conductance C (which is the inverse of resistance) across the building envelope may be defined by equations 2:

$$C \stackrel{def}{=} UA + \rho_{air} \cdot c_{p,air} \cdot \dot{V}_{air} \qquad (2)$$

where UA is the conductance area product, pair is the air density, and $\dot{V}_{air}$ is the volumetric flow rate of outdoor air entering the zone (or space).

Combining and rearranging equations 1 and 2 to determine the amount of heat provided (or removed) by the HVAC system yields equation 3:

$$\dot{Q}_{HVAC} = C \cdot (T_{zn} - T_{oa}) - \dot{Q}_{int} \qquad (3)$$

where the sign convention for heat entering the space is positive (+), and heat being removed from the space is negative (−). Accordingly, $\dot{Q}_{HVAC}$ will be a positive (+) value if the HVAC system is providing heat to the zone, and $\dot{Q}_{HVAC}$ will be a negative (−) value if the HVAC system is removing heat from the zone (or cooling the zone).

The HVAC system power $P_{HVAC}$ required to provide the $\dot{Q}_{HVAC}$ will be larger than the $\dot{Q}_{HVAC}$ due to the system efficiency $\eta_{equip}$ being less than unity. The HVAC system power $P_{HVAC}$ may be defined by equation 4.

$$P_{HVAC} = \frac{c}{\eta_{equip}} \cdot (T_{zn} - T_{oa}) - \frac{\dot{Q}_{int}}{\eta_{equip}} \qquad (4)$$

Changes in the HVAC system power $\Delta P_{HVAC}$ attributed to changes in the zone temperature $\Delta T_{zn}$ (or zone temperature setpoint $T_{zn,sp}$), outdoor temperature $\Delta T_{oa}$, or system efficiency $\Delta \eta_{equip}$ can be related by taking the total derivative of equation 4, resulting in equation 5:

$$\Delta P_{HVAC} = \frac{\delta P_{HVAC}}{\delta T_{zn}} \cdot \Delta T_{zn} + \frac{\delta P_{HVAC}}{\delta T_{oa}} \cdot \Delta T_{oa} + \frac{\delta P_{HVAC}}{\delta \eta_{equip}} \cdot \Delta \eta_{equip} \qquad (5)$$

which yields equation 6:

$$\Delta P_{HVAC} = \frac{c}{\eta_{equip}} \cdot \Delta T_{zn} - \frac{c}{\eta_{equip}} \cdot \Delta T_{oa} + \frac{\dot{Q}_{int} - C \cdot (T_{zn} - T_{oa})}{\eta_{equip}^2} \cdot \Delta \eta_{equip} \qquad (6)$$

where values of the heat flow conductance C and the heat transfer through the building envelope $Q_{int}$ are assumed to be constant over all of the operating conditions of the HVAC system.

Accordingly, in some embodiments, the power consumption change calculator 310 may calculate the estimated power consumption change $\Delta P_{HVAC}$ attributed to a change in the zone temperature $\Delta T_{zn}$ (or zone temperature setpoint), the outdoor temperature $\Delta T_{oa}$, and/or the system efficiency $\Delta \eta_{equip}$ using equation 6. However, for some HVAC systems, such as gas furnace heating systems, for example, it may be common to have a constant or near constant efficiency (e.g., $\Delta \eta_{equip} = 0$). In this case, the last term of equation 6 is equal to or substantially equal to 0 (or becomes negligible), resulting in equation 7:

$$\Delta P_{HVAC} = \frac{C}{\eta_{equip}} \cdot (\Delta T_{zn} - \Delta T_{oa}) \qquad (7)$$

On the other hand, for some HVAC systems, such as cooling systems that utilize vapor compression cycles to remove heat from the zone, for example, the system efficiency $\eta_{equip}$ is proportional to the outdoor air temperature $T_{oa}$, since heat is moved between heat reservoirs. In this case, the system efficiency $\eta_{equip}$ may be defined by equation 8:

$$\eta_{equip} \approx k \cdot T_{oa} \qquad (8)$$

wherein k is a gain constant with units of 1/T, where T is the temperature unit. Combining equations 6 and 8, the HVAC system power changes $\Delta P_{HVAC}$ attributed to changes in the zone temperature $\Delta T_{zn}$ (or zone temperature setpoint), changes in the outdoor temperature $\Delta T_{oa}$, and implicitly changes in the system efficiency $\Delta \eta_{equip}$ may be defined by equation 9:

$$\Delta P_{HVAC} = \frac{C}{k \cdot T_{oa}} \cdot \Delta T_{zn} - \frac{C}{k \cdot T_{oa}} \cdot \Delta T_{oa} + \frac{\dot{Q}_{int} - C \cdot (T_{zn} - T_{oa})}{(k \cdot T_{oa})^2} \cdot \Delta(k \cdot T_{oa}) \quad (9)$$

which yields equation 10:

$$\Delta P_{HVAC} = \frac{C}{k} \cdot \frac{1}{T_{oa}} \cdot \Delta T_{zn} + \frac{\dot{Q}_{int} - C \cdot T_{zn}}{k \cdot T_{oa}^2} \cdot \Delta T_{oa} \quad (10)$$

Accordingly, in some embodiments, the power consumption change calculator 310 may calculate the estimated power consumption change $\Delta P_{HVAC}$ attributed to a change in the zone temperature $\Delta T_{zn}$ (or zone temperature setpoint) and/or the outdoor temperature $\Delta T_{oa}$ using equations 7 and 10 depending on whether the HVAC system has a constant efficiency $\eta_{equip}$ (e.g., in the case of heating) or variable efficiency $\eta_{equip}$ (e.g., in the case of cooling). In other embodiments, the zone temperature (e.g., $T_{zn}$, $\Delta T_{zn}$, and the like) in the above equations (e.g., equations 7 and 10) may correspond to a zone temperature setpoint $T_{zn,sp}$ for HVAC systems where the control algorithm used (e.g., by the HVAC controller 320) is based off of feedback control or the like, since the zone temperature $T_{zn}$ should be equal to or substantially equal to the temperature setpoint $T_{zn,sp}$ on average under feedback control. Accordingly, in other embodiments, the power consumption change calculator may calculate the estimated power consumption change $\Delta P_{HVAC}$ attributed to a change in the zone temperature setpoint $\Delta T_{zn,sp}$ and/or the outdoor temperature $\Delta T_{oa}$ using equations 7 and 10 depending on whether the HVAC system has a constant efficiency $\eta_{equip}$ (e.g., in the case of heating) or variable efficiency $\eta_{equip}$ (e.g., in the case of cooling).

In some embodiments, the values of the heat flow conductance C, the gain constant k, and the internal heat loads $\dot{Q}_{int}$ may be unknown or may not be easily calculated. In this case, in some embodiments, the memory 308 includes a parameter estimator 312 to estimate the values of model parameters $k_1$ and $k_0$ from operating data (e.g., OAT 330, ZNT 332, Setpoint 333, heating outputs 334, cooling outputs 336, and/or the like) to determine the unknown values (e.g., C, k, and $\dot{Q}_{int}$) needed to solve for equations 7 and 10. For example, in some embodiments, the parameter estimator 312 may calculate least squares estimates of the model parameters $k_1$ and $k_0$ using training set triplets $[\overline{T}_{zn,sp} \ \overline{T}_{oa} \ \overline{P}_{HVAC}]$ that are collected and calculated from the operating data. In this case, $\overline{T}_{zn,sp}$ corresponds to the averaged (e.g., daily averaged) value of the zone temperature setpoint (or averaged value of the measured zone temperature $\overline{T}_{zn}$), $\overline{T}_{oa}$ corresponds to the averaged (e.g., daily averaged) value of the outdoor temperature, and $\overline{P}_{HVAC}$ corresponds to the averaged (e.g., daily averaged) value of the HVAC system power consumption. In some embodiments, the averaged values (e.g., $\overline{T}_{zn,sp}$, $\overline{T}_{oa}$, and $\overline{P}_{HVAC}$) are daily averaged values to compensate for staged equipment dynamics and the steady state assumptions used to simplify equation 1. In other embodiments, the accuracy of the estimated averaged value of the HVAC system power consumption $\overline{P}_{HVAC}$ may be improved by increasing the duration of the averaging interval (e.g., to multiple days), if desired. However, the present disclosure is not limited thereto, and the averaging interval may be any suitable interval (e.g., minutes, hours, days, months, years, and/or the like) that provides reliable operating data to generate the training set triplets $[\overline{T}_{zn,sp} \ \overline{T}_{oa} \ \overline{P}_{HVAC}]$.

In more detail, in some embodiments, the parameter estimator 312 may include an operating data collector 322 to collect the operating data and to calculate the training set triplets $[\overline{T}_{zn,sp} \ \overline{T}_{oa} \ \overline{P}_{HVAC}]$ based on the operating data, and a least squares calculator 324 to calculate the least squares estimates for the model parameters $k_0$ and $k_1$ based on the training set triplets $[\overline{T}_{zn,sp} \ \overline{T}_{oa} \ \overline{P}_{HVAC}]$. For example, in some embodiments, the operating data collector 322 generates the averaged value (e.g., daily averaged value) of the zone temperature setpoint $\overline{T}_{zn,sp}$ (or averaged value of the measured zone temperature $\overline{T}_{zn}$) from historical data of the temperature setpoints 333, generates the averaged value (e.g., daily averaged value) of the outdoor temperature $\overline{T}_{oa}$ corresponding to the zone temperature setpoint $\overline{T}_{zn}$ from historical data of the outdoor air temperature OAT 330 measured by the temperature sensor 344 or otherwise received by the thermostat 10 (e.g., from a 3$^{rd}$ party weather service), and generates the averaged value (e.g., daily averaged value) of the power consumed by the HVAC system $\overline{P}_{HVAC}$ based on historical data of the heating outputs 334 and cooling outputs 336 for the corresponding zone temperature setpoint $\overline{T}^{zn}$ and outdoor temperature $\overline{T}_{oa}$. In some embodiments, the operating data collector 322 generates a set of training data of length N (where N is a natural number) from the training set triplets $[\overline{T}_{zn,sp} \ \overline{T}_{oa} \ \overline{P}_{HVAC}]$, and stores the training data into an N×2 matrix A and N×1 vector b. In some embodiments, any training set triplets $[\overline{T}_{zn,sp} \ \overline{T}_{oa} \ \overline{P}_{HVAC}]$ resulting in $\overline{P}_{HVAC}$ being equal to or substantially equal to 0 (e.g., $|\overline{P}_{HVAC}| \sim 0$) is discarded from the training data.

For example, for an HVAC system having constant system efficiency $\eta_{equip}$ (e.g., $\Delta \eta_{equip} = 0$), equation 4 is already in a slope intercept form as shown in equation 11:

$$\overline{P}_{HVAC} = k_1 \cdot (\overline{T}_{zn,sp} - \overline{T}_{oa}) + k_0 \quad (11)$$

where $$k_0 \equiv -\frac{\dot{Q}_{int}}{\eta_{equip}} \text{ and } k_1 \equiv \frac{C}{\eta_{equip}}$$

In this case, to estimate the model parameters $k_0$ and $k_1$, the N×2 matrix A and the N×1 vector b (e.g., heating Matrix A) of the training data corresponding to the training set triplets $[\overline{T}_{zn,sp} \ \overline{T}_{oa} \ \overline{P}_{HVAC}]$ may be stored as:

$$A = \begin{bmatrix} (\overline{T}_{zn,sp} - \overline{T}_{oa})_1 & 1 \\ \ldots & 1 \\ (\overline{T}_{zn,sp} - \overline{T}_{oa})_N & 1 \end{bmatrix}$$

$$b = \begin{bmatrix} \overline{P}_{HVAC_1} \\ \ldots \\ \overline{P}_{HVAC_N} \end{bmatrix}$$

Accordingly, in some embodiments, the least squares calculator 324 calculates the least squares estimates for the model parameters k0 and k1 by solving the Normal Equation as defined by equation 12:

$$\begin{bmatrix} k_1 \\ k_0 \end{bmatrix} = (A^T A)^{-1} A^T b \tag{12}$$

In this constant system efficiency example (e.g., $\Delta\eta_{equip}=0$), since $$k_1 \equiv \frac{C}{\eta_{equip}},$$

the power consumption calculator 310 can use the value of $k_1$ obtained from the least squares estimate directly in equation 7 to calculate the change in the power consumption of the HVAC system $\Delta\overline{P}_{HVAC}$ attributed to a change in the zone temperature setpoint $\overline{T}_{zn,sp}$ for a given outdoor temperature $\overline{T}_{oa}$, as shown in equation 13:

$$\Delta\overline{P}_{HVAC} = k_1 \cdot (\Delta\overline{T}_{zn,sp} - \Delta\overline{T}_{oa}) \tag{13}$$

The discrete form of equation 13 using $z^i$ as a backshift operator is defined by equation 14, where $Z^0$ is the current value and $z^{-1}$ is a lag value (or last value):

$$\Delta\overline{P}_{HVAC, z^{-1} \to z^0} = k_1 \cdot [(\overline{T}_{zn,sp} \cdot z^0 - \overline{T}_{zn,sp} \cdot z^{-1}) - (\overline{T}_{oa} \cdot z^0 - \overline{T}_{oa} \cdot z^{-1})] \tag{14}$$

On the other hand, for an HVAC system having variable system efficiency $\eta_{equip}$ (e.g., $\eta_{equip} \approx k \cdot T_{oa}$) that is inversely proportional to the outdoor air temperature $T_{oa}$, equation 4 can be rewritten as shown in equation 15:

$$P_{HVAC} = \frac{C}{k} \cdot \frac{1}{T_{oa}} (T_{zn,sp} - T_{oa}) - \frac{\dot{Q}_{int}}{k} \cdot \frac{1}{T_{oa}} \tag{15}$$

Rewriting equation 15 into a slope intercept form using the averaged values of the zone temperature setpoint $\overline{T}_{zn,sp}$ (or averaged value of the measured zone temperature $\overline{T}_{zn}$), the outdoor temperature $\overline{T}_{oa}$, and the HVAC system power consumption $\overline{P}_{HVAC}$, results in equation 16:

$$\overline{P}_{HVAC} = k_1 \cdot \frac{1}{\overline{T}_{oa}} (\overline{T}_{zn,sp} - \overline{T}_{oa}) + k_0 \cdot \frac{1}{\overline{T}_{oa}} \tag{16}$$

where $$k_0 = -\frac{\dot{Q}_{int}}{k} \text{ and } k_1 = \frac{C}{k}$$

In this case, to estimate the model parameters $k_0$ and $k_1$, the N×2 matrix A and the N×1 vector b (e.g., cooling Matrix A) of the training data corresponding to the training set triplets $[\overline{T}_{zn,sp} \ \overline{T}_{oa} \ \overline{P}_{HVAC}]$ may be defined as:

$$A = \begin{bmatrix} (\overline{T}_{zn,sp} - \overline{T}_{oa})_1 \cdot \frac{1}{\overline{T}_{oa_1}} & \frac{1}{\overline{T}_{oa_1}} \\ \cdots & \cdots \\ (\overline{T}_{zn,sp} - \overline{T}_{oa})_N \cdot \frac{1}{\overline{T}_{oa_N}} & \frac{1}{\overline{T}_{oa_N}} \end{bmatrix}$$

$$b = \begin{bmatrix} \overline{P}_{HVAC_1} \\ \cdots \\ \overline{P}_{HVAC_N} \end{bmatrix}$$

Accordingly, in some embodiments, the least squares calculator 324 calculates the least squares estimates for the model parameters k0 and k1 by solving the Normal Equation as defined by equation 17:

$$\begin{bmatrix} k_1 \\ k_0 \end{bmatrix} = (A^T A)^{-1} A^T b \tag{17}$$

In this variable system efficiency example (e.g., $\eta_{equip} \approx k \cdot T_{oa}$), the power consumption calculator 310 can use the values of the model parameters $k_0$ and $k_1$ obtained from the least squares estimate into equation 18 (corresponding to equation 10 that is rewritten based on the estimates of the model parameters $k_0$ and $k_1$ calculated using equation 17) to calculate the change in the power consumption of the HVAC system $\Delta\overline{P}_{HVAC}$ attributed to a change in the zone temperature setpoint $\overline{T}_{zn,sp}$ for a given outdoor temperature $\overline{T}_{oa}$:

$$\Delta\overline{P}_{HVAC} = k_0 \cdot \frac{1}{\overline{T}_{oa}} \cdot \Delta\overline{T}_{zn,sp} - [k_0 + k_1 \cdot \overline{T}_{zn}] \frac{1}{\overline{T}_{oa}^2} \cdot \Delta\overline{T}_{oa} \tag{18}$$

The discrete form of equation 18 using $z^i$ as a backshift operator is defined by equation 19, where $Z^0$ is the current value and $z^{-1}$ is a lag value (or last value):

$$\Delta\overline{P}_{HVAC, z^{-1} \to z^0} = \tag{19}$$
$$k_0 \cdot \frac{1}{\overline{T}_{oa} \cdot z^0} \cdot (\overline{T}_{zn,sp} \cdot z^0 - \overline{T}_{zn,sp} \cdot z^{-1}) - [k_0 + k_1 \cdot \overline{T}_{zn,sp} \cdot z^0] \cdot \frac{1}{\overline{T}_{oa}^2 \cdot z^0}$$
$$(\overline{T}_{oa} \cdot z^0 - \overline{T}_{oa} \cdot z^{-1})$$

Accordingly, in some embodiments, the thermostat 10 calculates the least squares estimate of the model parameters $k_0$ and $k_1$ to compensate for the unknown values of equations 7 and 10 (e.g., C, k, and $\dot{Q}_{int}$). In some embodiments, the thermostat 10 can calculate the estimated power consumption change $\Delta P_{HVAC}$ attributed to a change in the zone temperature setpoint $\Delta T_{zn,sp}$ (or measured zone temperature $\Delta T_{zn}$) corresponding to a given outdoor temperature $\Delta T_{oa}$ according to the system efficiency $\eta_{equip}$ using equations 13 and 18 or in the discrete forms of equations 14 and 19. For example, in some embodiments, the thermostat 10 can calculate the estimated power consumption change $\Delta P_{HVAC}$ for one or more alternative (or different) setpoints than the temperature setpoint or schedule that is currently (or actually) used (e.g., currently set as the setpoint 333).

In some embodiments, the one or more alternative (or different) setpoints can be user defined. For example, in some embodiments, the user can interact with the thermostat 10 to specify one or more different temperature setpoints or schedules, and the power consumption change calculator 310 can generate the estimated change in power consumption $\Delta P_{HVAC}$ for each of the one or more different temperature setpoints or schedules. In some embodiments, the thermostat 10 may receive one or more alternative (or different) setpoints or schedules from a cloud platform. For example, in some embodiments, the cloud platform may receive data from a plurality of thermostats or building management systems. In this case, the cloud platform may provide one or more alternative (or different) setpoints or schedules to thermostat 10 that have been used by other thermostats associated with buildings (e.g., a residence) having one or more attributes that are similar to those of residence 24. In some embodiments, the one or more alternative setpoints or schedules may be fixed. For example, in some embodiments, the alternative setpoint or schedule may corresponding to a fixed interval (e.g., 1 degree, 2 degrees, and/or the like) from the actual setpoint or schedule.

In some embodiments, the memory 308 includes a power savings monetization estimator 314. The power saving monetization estimator 314 may calculate a monetized savings corresponding to the change in HVAC system power consumption $\Delta \overline{P}_{HVAC,z-1 \to z0}$ calculated by the power consumption change calculator 310. For example, in some embodiments, the power savings monetization estimator 314 may calculate the monetized savings $\Delta \$$ using equation 20:

$$\Delta \$ = \Delta \overline{P}_{HVAC,z-1 \to z0} \cdot \Delta t_{average} \cdot \frac{\$}{\text{units of } P} \quad (20)$$

where $\Delta t_{average}$ is the averaging period length used to calculate the training set triplets $[\overline{T}_{zn,sp} \ \overline{T}_{oa} \ \overline{P}_{HVAC}]$.

In some embodiments, the power consumption change calculator 310 and the power savings monetization estimator 314 may provide the estimated change in power consumption $\Delta P_{HVAC}$ and the corresponding potential monetized savings for each of the alternative (or different) setpoints or schedules to the user interface controller 316 for display on the user interface 14. In some embodiments, the HVAC controller 320 automatically adjusts the current temperature setpoint or schedule based on the potential savings in power usage or monetary savings of a theoretical or different temperature setpoint or schedule than the one currently used.

For example, in some embodiments, the power consumption change calculator 310 compares the estimated change in power consumption $\Delta P_{HVAC}$ for one or more theoretical or different temperature setpoints or schedules with the power consumption estimated for the currently used temperature setpoint or schedule to determine if any of the different temperature setpoints or schedules would likely result in savings in power consumption. If the power consumption change calculator 310 determines that the predicted change in power consumption $\Delta P_{HVAC}$ for the different temperature setpoint(s) or schedule(s) is likely to result in savings, the power consumption change calculator 310 can automatically adjust the currently used temperature setpoint or schedule to the different temperature setpoint or schedule to operate the HVAC equipment according to the adjusted temperature setpoint or schedule. For example, in some embodiments, the power consumption change calculator 310 may automatically adjust the temperature setpoint or schedule when the resulting savings exceeds a user defined or predetermined threshold savings value. In other embodiments, the power consumption change calculator 310 can automatically adjust the temperature setpoint or schedule whenever it determines that any savings can result.

In some embodiments, the power consumption change calculator 310 or the power savings monetization estimator 314 may include a model predictive controller that can determine a temperature setpoint trajectory that provides a pre-determined amount of daily energy cost savings. For example, if the building or residence mass is used for thermal energy storage, the model predictive controller can determine the savings attributed to the temperature setpoint trajectory. In this case, hourly averaged values of the training set triplets $[\overline{T}_{zn,sp} \ \overline{T}_{oa} \ \overline{P}_{HVAC}]$ may be used in lieu of daily averages. In some embodiments, users of thermostat 10 can determine how much monetary savings can be realized by simply adjusting the temperature setpoint up or down. For example, in some embodiments, thermostat 10 can receive a proposed temperature setpoint input by the user to calculate the power consumption change and/or the monetary savings (e.g., by the power consumption change calculator 310 and the power savings monetization estimator 314) attributed to the proposed temperature setpoint.

In some embodiments, the user interface controller 316 is configured to cause the user interface 14 to display various runtime information (e.g., current estimated power consumption, estimated changed power consumption, estimated monetary amount resulting from the change, and/or the like) and/or allow the user to interact with the runtime information. In some embodiments, the user interface controller 316 is configured to display various graphics, charts, and/or other indications of the runtime information for various periods of time (e.g., hours, days, weeks, months, years, etc.). In this regard, in some embodiments, the user interface controller 316 is configured to store the runtime information for various hours, days, months, and/or years. In some embodiments, the user can interact with the user interface 14 to set parameters of when to automatically adjust the temperature setpoint or schedule based on the potential power and/or monetary savings. For example, the user can set the threshold savings value or level, such as optimum level of savings or optimal comfort level regardless of the potential savings. In some embodiments, the user can specify a policy (e.g., occupant comfort, energy savings, nighttime, day time, time of year, and/or the like) and the thermostat 10 may automatically adjust the temperature setpoint or schedule based on the estimated saving(s) and the policy. In some embodiments, the user is presented via the user interface 14 the various runtime information and can define the setpoint or schedule based on the various runtime information. For example, in some embodiments, the user can assess the tradeoffs between occupant comfort and the potential savings in power usage or energy costs based on the various runtime information in order to set the setpoint or schedule.

Figure 4:
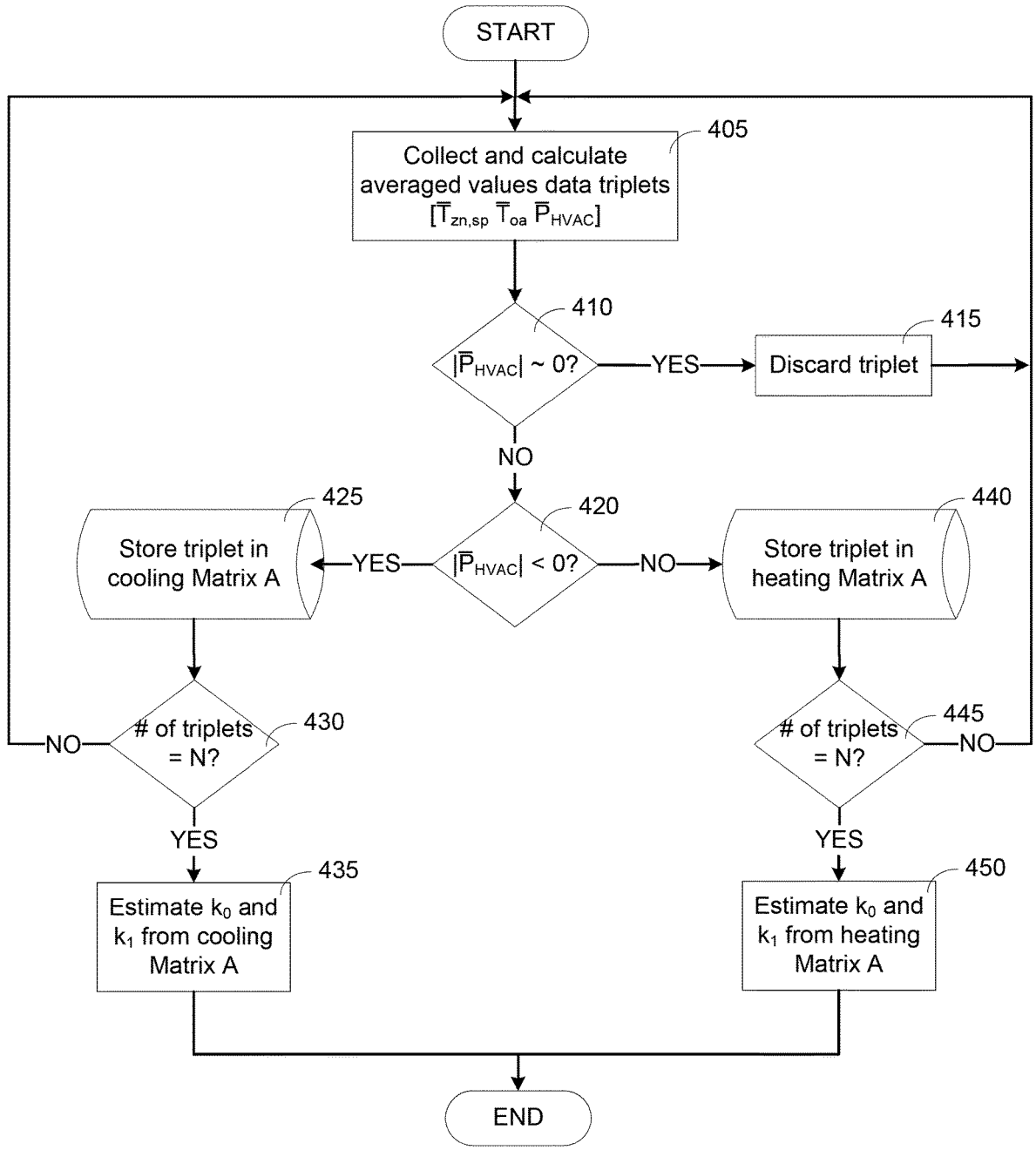
FIG. 4 is a flow diagram of a process for generating data triplets used to estimate model parameters, according to an example embodiments.

FIG. 4 is a flow diagram of a process for generating the data triplets $[\overline{T}_{zn,sp} \ \overline{T}_{oa} \ \overline{P}_{HVAC}]$ used for estimating the model parameters $k_0$ and $k_1$, according to some embodiments. Referring to FIG. 4, the process starts and average values of the data triplets are collected and calculated (e.g., by the operating data collector 322) from the operating data (e.g., OAT 330, ZNT 332, Setpoint 333, heating outputs 334, cooling outputs 336, and/or the like) at block 405. For example, in some embodiments, the operating data collector 322 generates the averaged value (e.g., daily averaged value) of the zone temperature setpoint $\overline{T}_{zn,sp}$ (or averaged value of the measured zone temperature $\overline{T}_{zn}$) from historical data of the temperature setpoints 333, generates the averaged value (e.g., daily averaged value) of the outdoor temperature $\overline{T}_{oa}$ corresponding to the zone temperature setpoint $T_{zn}$ from historical data of the outdoor air temperature OAT 330 measured by the temperature sensor 344 or otherwise received by the thermostat 10 (e.g., from a $3^{rd}$ party weather service), and generates the averaged value (e.g., daily averaged value) of the power consumed by the HVAC system $\overline{P}_{HVAC}$ based on historical data of the heating outputs 334 and cooling outputs 336 for the corresponding zone temperature setpoint $T_{zn}$ and outdoor temperature $T_{oa}$.

In some embodiments, the operating data collector 322 determines whether the averaged value of the power consumed by the HVAC system $\overline{P}_{HVAC}$ for a corresponding data triplet $[T_{zn,sp}\ T_{oa}\ \overline{P}_{HVAC}]$ is equal to or substantially equal to zero (e.g., $|\overline{P}_{HVAC}| \sim 0$) at block 410. If the operating data collector 322 determines that $\overline{P}_{HVAC}$ is equal to or substantially equal to zero at block 410 (e.g., due to no HVAC equipment being operated), then the corresponding data triplet $[T_{zn,sp}\ T_{oa}\ \overline{P}_{HVAC}]$ is discarded at block 415, and a next data triplet $[T_{zn,sp}\ T_{oa}\ \overline{P}_{HVAC}]$ is collected and calculated at block 405. If the operating data collector 322 determines that $\overline{P}_{HVAC}$ does not equal to or substantially equal to zero at block 410, then the operating data collector 322 determines whether $\overline{P}_{HVAC}$ is a positive value or negative value (e.g., $|\overline{P}_{HVAC}| < 0$) at block 420.

In some embodiments, if the operating data collector 322 determines that $\overline{P}_{HVAC}$ is negative (e.g., $|\overline{P}_{HVAC}| < 0$) at block 420 (for example, in the case of cooling), then the operating data collector 322 stores the corresponding data triplet [$T_{zn,sp}\ T_{oa}\ \overline{P}_{HVAC}$] in a cooling Matrix A at block 425 as described with reference to the variable system efficiency $\eta_{equip}$ case above. The operating data collector 322 determines whether the number of data triplets stored in the cooling Matrix A is equal to (or greater than or equal to) N (where N is a natural number) at block 430. If not, then a next data triplet $[T_{zn,sp}\ T_{oa}\ \overline{P}_{HVAC}]$ is collected and calculated at block 405. If the number of data triplets stored in the cooling Matrix A is equal to (or greater than or equal to) N at block 430, then the least squares calculator 324 calculates the least squares estimates for the model parameters $k_0$ and $k_1$ from the cooling Matrix A at block 435, and the process ends. In some embodiments, the power consumption change calculator 310 uses the estimates for the model parameters $k_0$ and $k_1$ to calculate the expected change in power consumption $P_{HVAC}$ using equation 18 or equation 19 as discussed above.

On the other hand, in some embodiments, if the operating data collector 322 determines that $\overline{P}_{HVAC}$ is positive (e.g., $|\overline{P}_{HVAC}| > 0$) at block 420 (for example, in the case of heating), then the operating data collector 322 stores the corresponding data triplet $[T_{zn,sp}\ T_{oa}\ \overline{P}_{HVAC}]$ in a heating Matrix A at block 440 as described with reference to the constant system efficiency $\eta_{equip}$ case above. The operating data collector 322 determines whether the number of data triplets stored in the heating Matrix A is equal to (or greater than or equal to) N (where N is a natural number) at block 445. If not, then a next data triplet $[T_{zn,sp}\ T_{oa}\ \overline{P}_{HVAC}]$ is collected and calculated at block 405. If the number of data triplets stored in the heating Matrix A is equal to (or greater than or equal to) N at block 445, then the least squares calculator 324 calculates the least squares estimates for the model parameters $k_0$ and $k_1$ from the heating Matrix A at block 450, and the process ends. In some embodiments, the power consumption change calculator 310 uses the estimates for the model parameters $k_0$ and $k_1$ to calculate the expected change in power consumption $P_{HVAC}$ using equation 13 or equation 14 as discussed above.

Figure 5:
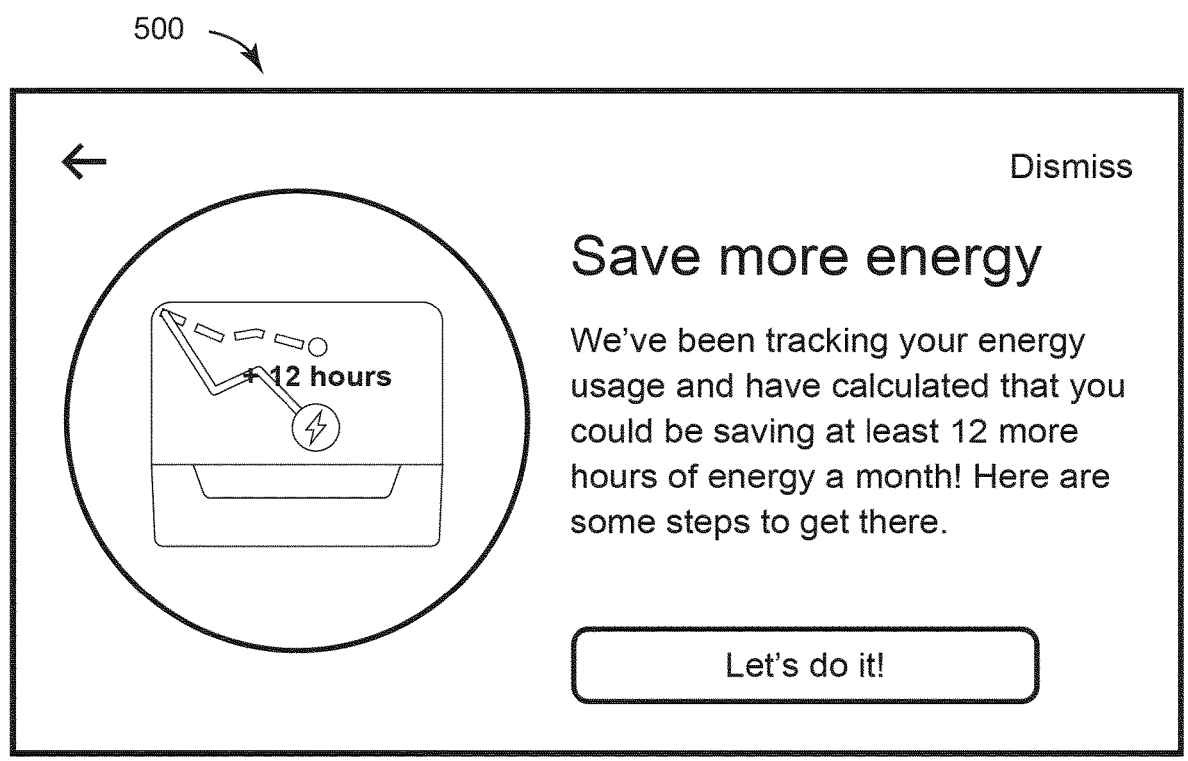
FIG. 5 is a user interface of the thermostat for displaying an energy savings notification to a user of the thermostat.

FIG. 5 is a user interface 500 for displaying potential power savings to a user via the user interface 14, according to an example embodiment. Referring to FIG. 5, if the thermostat 10 determines that more energy savings can be accomplished by using a different temperature setpoint or setpoint schedule than the one currently used, a notification may appear in the form of the interface 500 to guide the user through steps to increase the energy savings. In some embodiments, the notification may be generated whenever the thermostat 10 determines a more optimal temperature setpoint or setpoint schedule. In other embodiments, the notification may be generated if the energy savings or monetary savings calculated for a different temperature setpoint or schedule exceeds a predefined amount of energy savings or monetary savings over a period of a predefined amount of time (e.g., hour, day, month, year, and/or the like).

Configuration of Example Embodiments

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A space controller comprising:
one or more processors; and
one or more non-transitory computer-readable media storing instructions that, when executed by the one or more processors, cause the one or more processors to perform operations comprising:
obtaining a power consumption model that defines a change in power consumption of HVAC equipment that operate to provide heating or cooling to a space as a function of a change in temperature setpoint for the space and one or more model parameters that represent thermal properties of the space;
estimating values of the one or more model parameters based on training data comprising values of the power consumption of the HVAC equipment, the temperature setpoint for the space, and outdoor air temperature at a plurality of times within a training period;
using the power consumption model and the values of the one or more model parameters to predict a change in the power consumption of the HVAC equipment expected to result from a change in the temperature setpoint.

2. The space controller of claim 1, wherein the power consumption model defines the change in the power consumption of the HVAC equipment as a function of a change in the outdoor air temperature, the change in the temperature setpoint, and the one or more model parameters.

3. The space controller of claim 2, wherein the one or more model parameters define an internal heat generation of the space, a thermal capacitance of the space, and a thermal conductivity of heat transfer of the space.

4. The space controller of claim 1, wherein the power consumption model predicts the change in the power consumption of the HVAC equipment resulting from a change in at least one of the outdoor air temperature and the temperature setpoint.

5. The space controller of claim 1, wherein the training data comprises a plurality of data triplets, each data triplet comprising a value of the temperature setpoint, the outdoor air temperature, and the power consumption at a particular time.

6. The space controller of claim 1, wherein the operations performed by the one or more processors further comprise:
estimating a monetized savings amount for a particular change in the power consumption;
wherein the monetized savings amount is estimated using an average time period used to obtain the training data.

7. The space controller of claim 6, wherein the operations performed by the one or more processors further comprise:
providing at least one of the change in the power consumption or the estimated change in the monetized savings amount to a user interface for display;
wherein the change in the power consumption or the estimated change in the monetized savings amount are provided to the user interface for a plurality of different temperature setpoints.

8. The space controller of claim 6, wherein the operations performed by the one or more processors further comprise:
estimating the monetized savings amount for a plurality of different temperature setpoints; and
automatically adjusting a currently used temperature setpoint or a schedule of the temperature setpoint based on the monetized savings amount to reduce the monetized savings amount.

9. A system for estimating power savings associated with operating equipment, the system comprising:
building equipment operable to affect a variable state or condition of a space; and
a space controller comprising:
one or more processors; and
one or more non-transitory computer-readable media storing instructions that, when executed by the one or more processors, cause the one or more processors to perform operations comprising:
obtaining a power consumption model that defines a change in power consumption of HVAC equipment that operate to provide heating or cooling to the space as a function of a change in temperature setpoint for the space and one or more model parameters that represent thermal properties of the space;
estimating values of the one or more model parameters based on training data comprising values of the power consumption of the HVAC equipment, the temperature setpoint for the space, and outdoor air temperature at a plurality of times within a training period;
using the power consumption model and the values of the one or more model parameters to predict a change in the power consumption of the HVAC equipment expected to result from a change in the temperature setpoint.

10. The system of claim 9, wherein the power consumption model defines the change in the power consumption of the HVAC equipment as a function of a change in the outdoor air temperature, the change in the temperature setpoint, and the one or more model parameters.

11. The system of claim 10, wherein the one or more model parameters define an internal heat generation of the space, a thermal capacitance of the space, and a thermal conductivity of the space.

12. The system of claim 9, wherein the power consumption model predicts the change in the power consumption of the HVAC equipment resulting from a change in at least one of the outdoor air temperature and the temperature setpoint.

13. The system of claim 9, wherein the training data comprises a plurality of data triplets, each data triplet comprising a value of the temperature setpoint, the outdoor air temperature, and the power consumption at a particular time.

14. The system of claim 9, wherein the operations performed by the one or more processors further comprise:
estimating a monetized savings amount for a particular change in the power consumption;
wherein the monetized savings amount is estimated using an average time period used to obtain the training data.

15. The system of claim 14, wherein the operations performed by the one or more processors further comprise:
providing at least one of the change in the power consumption or the estimated change in the monetized savings amount to a user interface for display;
wherein the change in the power consumption or the estimated change in the monetized savings amount are provided to the user interface for a plurality of different temperature setpoints.

16. The system of claim 14, wherein the operations performed by the one or more processors further comprise:
estimating the monetized savings amount for a plurality of different temperature setpoints; and
automatically adjusting a currently used temperature setpoint or a schedule of the temperature setpoint based on the monetized savings amount to reduce the monetized savings amount.

17. A method for estimating power consumption of equipment, the method comprising:
obtaining a power consumption model that defines power consumption of HVAC equipment that operate to provide heating or cooling to a space as a function of a temperature setpoint for the space and one or more model parameters that represent thermal properties of the space;
estimating values of the one or more model parameters based on training data comprising values of the power consumption of the HVAC equipment, the temperature setpoint for the space, and outdoor air temperature at a plurality of times within a training period;
using the power consumption model and the values of the one or more model parameters to predict the power consumption of the HVAC equipment expected to result from a new value of the temperature setpoint.

18. The method of claim 17, wherein the power consumption model defines the change in the power consumption of the HVAC equipment as a function of the outdoor air temperature, the temperature setpoint, and the one or more model parameters.

19. The method of claim 18, wherein the one or more model parameters define an internal heat generation of the space, a thermal capacitance of the space, and a thermal conductivity of the space.

20. The method of claim 17, wherein the training data comprises a plurality of data triplets, each data triplet comprising a value of the temperature setpoint, the outdoor air temperature, and the power consumption at a particular time.

* * * * *